United States Patent
Lescorail et al.

(10) Patent No.: US 10,082,200 B2
(45) Date of Patent: Sep. 25, 2018

(54) PULLEY DEVICE FOR TENSIONER OR IDLER

(71) Applicants: Romuald Lescorail, Saint Cyr sur Loire (FR); Frederic Liege, Monts (FR)

(72) Inventors: Romuald Lescorail, Saint Cyr sur Loire (FR); Frederic Liege, Monts (FR)

(73) Assignee: AKTIEBOLAGET SKF, Gothenburg (SE)

( * ) Notice: Subject to any disclaimer, the term of this patent is extended or adjusted under 35 U.S.C. 154(b) by 172 days.

(21) Appl. No.: 15/143,696

(22) Filed: May 2, 2016

(65) Prior Publication Data

US 2016/0327146 A1 Nov. 10, 2016

(30) Foreign Application Priority Data

May 4, 2015 (FR) ...................... 15 53964

(51) Int. Cl.
| | | |
|---|---|---|
| *F16H 55/36* | (2006.01) | |
| *F16C 35/073* | (2006.01) | |
| *F16H 7/20* | (2006.01) | |
| *F16C 13/00* | (2006.01) | |

(52) U.S. Cl.
CPC ............ *F16H 55/36* (2013.01); *F16C 35/073* (2013.01); *F16C 13/006* (2013.01); *F16C 2361/63* (2013.01); *F16H 7/20* (2013.01)

(58) Field of Classification Search
CPC .......... F16H 55/36; F16H 7/20; F16C 35/073; F16C 13/006; F16C 2361/63
See application file for complete search history.

(56) References Cited

U.S. PATENT DOCUMENTS

| | | | | |
|---|---|---|---|---|
| 2004/0097313 A1* | 5/2004 | Singer | .................. | F16C 13/006 474/199 |
| 2009/0298630 A1* | 12/2009 | Mineno | ................. | F16C 35/063 474/199 |
| 2011/0152025 A1* | 6/2011 | Wilson | .................. | F16C 13/006 474/166 |
| 2015/0125103 A1* | 5/2015 | Ciulla | .................... | F16C 13/006 384/512 |
| 2015/0141185 A1* | 5/2015 | Albrecht | ............... | F16H 7/1281 474/199 |
| 2015/0292603 A1* | 10/2015 | Cherioux | ............ | F16C 33/7886 474/166 |
| 2016/0356375 A1* | 12/2016 | Chollet | ................. | F16C 35/073 |

FOREIGN PATENT DOCUMENTS

| | | |
|---|---|---|
| DE | 10043840 A1 | 3/2002 |
| DE | 102005002029 A1 | 7/2006 |
| DE | 102008051648 A1 | 3/2010 |
| EP | 1120584 A1 | 8/2001 |
| FR | 2954437 A1 | 6/2011 |

\* cited by examiner

*Primary Examiner* — Michael R Mansen
*Assistant Examiner* — Robert T Reese
(74) *Attorney, Agent, or Firm* — Bryan Peckjian; SKF USA Inc. Patent Dept.

(57) ABSTRACT

The invention relates to a pulley device for tensioner or idler for a belt or a chain having a pulley, a bearing, a spacer supporting the bearing and including a through bore, a fastening screw extending in the bore, and an axial retention member for the screw, the axial retention member being fixed to the spacer and providing a retention member that cooperates with the screw.

19 Claims, 5 Drawing Sheets

PULLEY DEVICE FOR TENSIONER OR IDLER

CROSS-REFERENCE TO RELATED APPLICATIONS

This application claims priority to French patent application no. 1553964 filed on May 4, 2015, the contents of which are fully incorporated herein by reference.

FIELD OF THE INVENTION

The present invention relates to the field of pulley devices for tensioner or idler designed to cooperate with a chain or a belt, for example a timing belt for an internal combustion automobile motor.

BACKGROUND OF THE INVENTION

Such devices are typically used to continuously maintain tension on the chain or the belt in a specific range of tension value or to locally modify the path taken by the chain or belt. This is called tensioner or idler, respectively. In idlers, the pulley is rotatably mounted on a screw or an axle via a bearing, the idler being fixed directly or indirectly to an engine block or to an element of an idler assembly, such as an arm or an eccentric. The bearing is a mechanical device for implementing the pivot connection between the pulley and the screw or axle, and may be a rolling bearing for this purpose.

A spacer cooperating with the screw or axle is typically used to fix the idler on its support. It is desirable during the idler mounting that the screw or the axle is axially secured to the other elements of the idler and including the pulley. This provides a non-removable assembly which is easy to handle and transport, and be easily mounted.

For this purpose, it is known from EP-A1-1 120 584 a device providing a pulley, a bearing, a spacer supporting the bearing and a fastening screw axially immobilized relative to the spacer. An elastic ring allows the axial retention of the screw relative to the spacer. However, this solution has the drawback that the elastic ring is difficult to install and its position is not always maintained.

In FR-A1-2 954 437, another axial retaining means for the screw is described, including a retainer ring interposed between the spacer and the fastening screw and able to cooperate with a specific groove provided to the screw. This solution is not fully satisfactory since it requires a special design of the screw. Moreover, there is a risk of loss of the retainer ring before mounting of the fastening screw when assembling the device. A relatively large clearance has to be provided to the front surface of the spacer to allow the retainer ring mounting. It reduces the contact surface between the spacer and its support.

The present invention aims to remedy these drawbacks.

SUMMARY OF THE INVENTION

More particularly, the present invention aims to provide a pulley device easy to manufacture, to assemble and of reduced cost.

According to a first aspect of the invention, a pulley device for tensioner or idler for a belt or a chain provides a pulley, a bearing, a spacer supporting the bearing and comprising a through bore, a fastening screw extending in the bore, and an axial retention member for the screw. The axial retention member is fixed to the spacer and provides retention means cooperating with the screw. Axial retention member further provides a fixing portion with a rib extending in an annular groove provided to an outer surface of the spacer.

The implementation of the axial retention member is eased by the fact that it is fixed to the spacer. The risk of loss of the member is reduced. Thanks to the retention means, the screw is efficiently axially retained in the spacer. Moreover, standard fastening screws can be used, without any groove. The fixing portion permits the fixation of the retention member to the spacer.

In one embodiment, the axial retention member is fixed to an axial end of the spacer.

In another embodiment, the retention means of the axial retention member are elastically deformable at least in the radial direction and cooperate with the screw by contact.

In one embodiment, the retention means of the axial retention member extend obliquely towards the screw and are able to axially block the screw by arc boutement effect.

Such a design of retention means ensures an efficient retention of the screw relative to the spacer, without impairing the ease of assembly.

In one embodiment, the spacer bore provides a chamfer, the retention means of the axial retention member being radially disposed within the chamfer.

According to another embodiment, the axial retention member provides a support portion in axial abutment against an end surface of the spacer.

In that embodiment, the retention means can extend radially towards the interior from the support surface.

Advantageously, the fixing portion is axial and is provided with an annular rib directed radially towards the interior of the device.

A pulley device according to any of the previous embodiments can be assembly according to a process wherein a sub-assembly comprising a pulley, a bearing, a spacer supporting the spacer and comprising a through bore, and an axial retention member fixed to the spacer is assembled; a screw fixation is then inserted within the bore of spacer, the axial retention means comprising retention means cooperating with the screw to axially block the screw in the opposite direction to its insertion direction.

BRIEF DESCRIPTION OF THE DRAWINGS

Other objects, features and advantages of the invention will be discussed in the following description, given by way of a non-limiting example, and with reference to the annexed drawings in which.

DETAILED DESCRIPTION OF THE INVENTION

Figure 1:
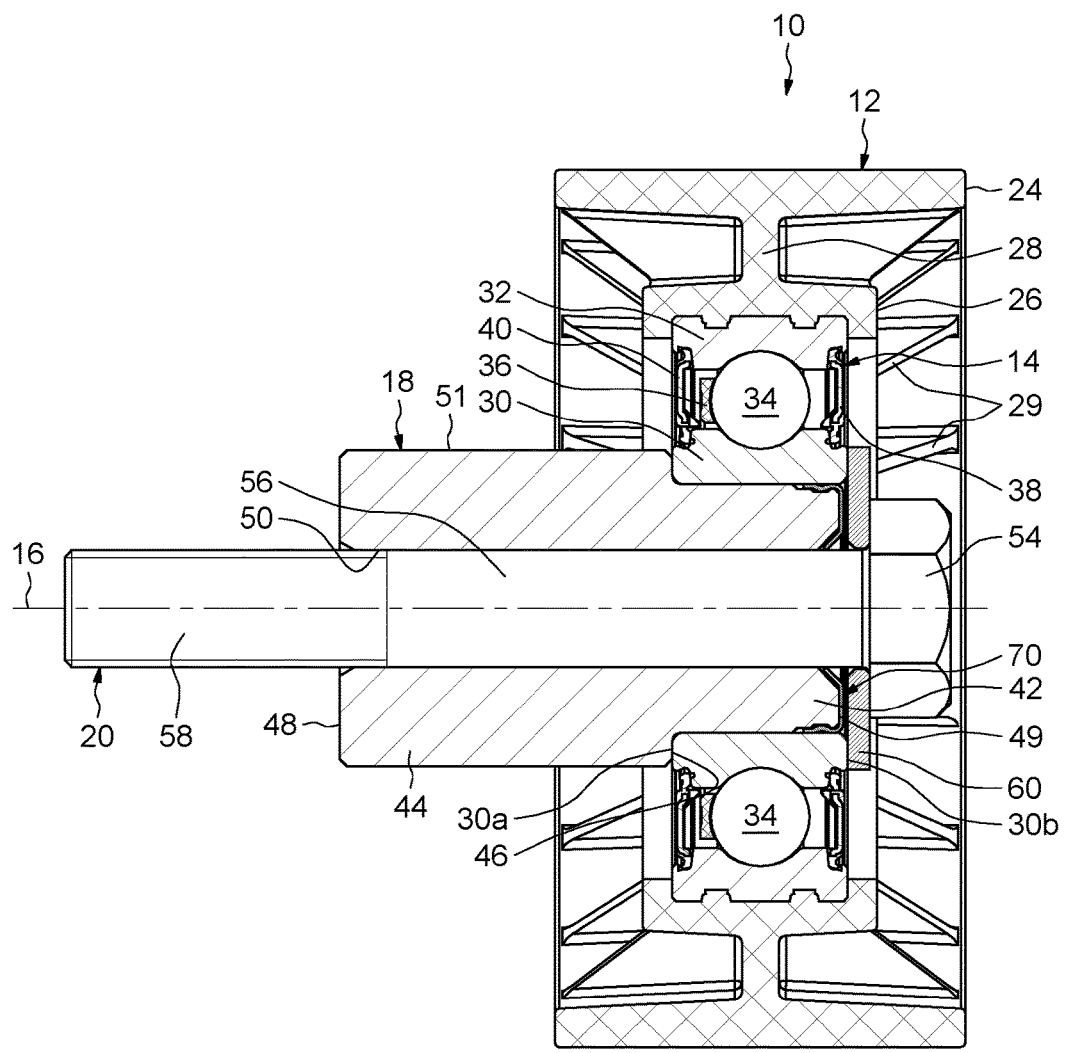
FIG. 1 is an axial sectional view of a pulley device according to a first embodiment of the invention.

As illustrated in FIG. 1, a pulley device for tensioner or idler for a belt or a chain, referenced as 10, provides a pulley 12, a rolling bearing 14, a spacer 18 of general cylindrical shape and a fastening screw 20. Screw 20 has function to secure the pulley device 10, notably comprising the pulley 12, the bearing 14 and the spacer 18, with an external support (not shown).

As it will be further described, the device 10 further provides a member to ensure the axial retention of the fastening screw 20 relative to the spacer 18.

Pulley device 10 is of substantially revolution shape around an axis 16. Pulley 12 provides an outer axial portion 24 with an outer surface dedicated to cooperate with a belt or a chain (not shown), and inner axial portion 26 and an annular intermediate radial portion 28 connecting the outer portion 24 and inner portion 26. Outer portion 24 and inner portion 26 are concentric with axis 16. Stiffening ribs 29 are provided between the inner portion 26 and the outer portion 24, the ribs being connected to the intermediate portion 28.

The rolling bearing 14, of axis 16, provides an inner ring 30, an outer ring 32, a row of rolling elements 34, here balls, arranged between raceways provided on the rings 30, 32, and a cage 36 for maintaining circumferentially spaced the rolling elements 34. Rolling bearing 14 further provides on each side annular sealing means 38, 40 fixed to the outer ring 32 to close the radial space defined between the inner and outer rings 30, 32 and in which are arranged the rolling elements 34 and the cage 36.

In this illustrated embodiment, the rings are massive, i.e. their form being obtained by machining with chip removal (turning, grinding) from tubes, bars, forged and/or rolled blanks.

The inner ring 30 provides an axial outer surface provided with a toroidal raceway for the rolling elements 34. The inner ring 30 also provides a bore (not referenced) mounted or fitted on the spacer 18 and two radial front surfaces 30a, 30b that axially define the bore and outer surface. The outer ring 32 gas a similar design.

In the illustrated embodiment, pulley 12 is obtained by overmoulding onto the outer ring 32 of a plastic material, such as polyamide. This results in an excellent cohesion between these parts. Alternatively, pulley may be of sheet metal and fitted on the outer ring 32. In another variant, the pulley and the outer ring may be formed integrally.

Spacer 18 of axis 16 provides a cylindrical axial portion 42 of axis 16 on which the inner ring 30 of bearing 14 is adjusted. One axial end of the axial portion 42 is extended by a cylindrical axial portion 44 of larger diameter. An annular radial shoulder 46 is defined between the axial portions 42, 44 and forms a support surface against which the front surface 30a of the inner ring 30 axially abuts. On the opposite axial side to the shoulder 46, the axial portion 44 is delimited by a front radial surface 48 able to abut against an external support to allow the mounting and the fixation of the device on the support. For example, support may be an engine block, an arm or an eccentric of the associated tensioner. The axial portion 44 axially protrudes from the pulley 12. On the opposite axial side to the front radial surface 48, the axial portion 42 is delimited by a front radial surface 49. The spacer 18 is axially delimited between the front radial surfaces 48 and 49.

In this embodiment, the axial dimension of the axial portion 42, equal to the distance between the surfaces 46 and 49, is slightly lower than the inner ring 30. Then the radial surface 49 is slightly axially offset with respect to the radial surface 30b.

Spacer 18 provides a cylindrical through bore 50 of axis 16, in which the fastening screw 20 extends. Screw 20 can be adjusted with a more or less important radial clearance in the bore 50. Bore 50 axially extends from the radial surface 49 towards the radial surface 48. The outer surface 51 of spacer 18, corresponding to the outer surfaces of portions 42 and 44, is of axis 16 and radially opposed to the inner surface of bore 50.

Fastening screw 20 provides a screw head 54 and a rod provided with a smooth portion 56 extending axially from the head 54 and being centered in the bore 50. The rod of fastening screw 20 further provides a threaded portion 58 at the opposite side to the head 54. Threaded portion 58 is axially protruding from the radial surface 48 of spacer 18. Threaded portion 58 is dedicated to be inserted in a threaded hole provided to the external support. Device 10 further provides a ring 60 disposed around the smooth portion 56 and contacting the head 54. Head 54 comes in axial abutment against the ring 60, this latter coming into abutment against the front surface 30b of the inner ring 30.

Figure 2:
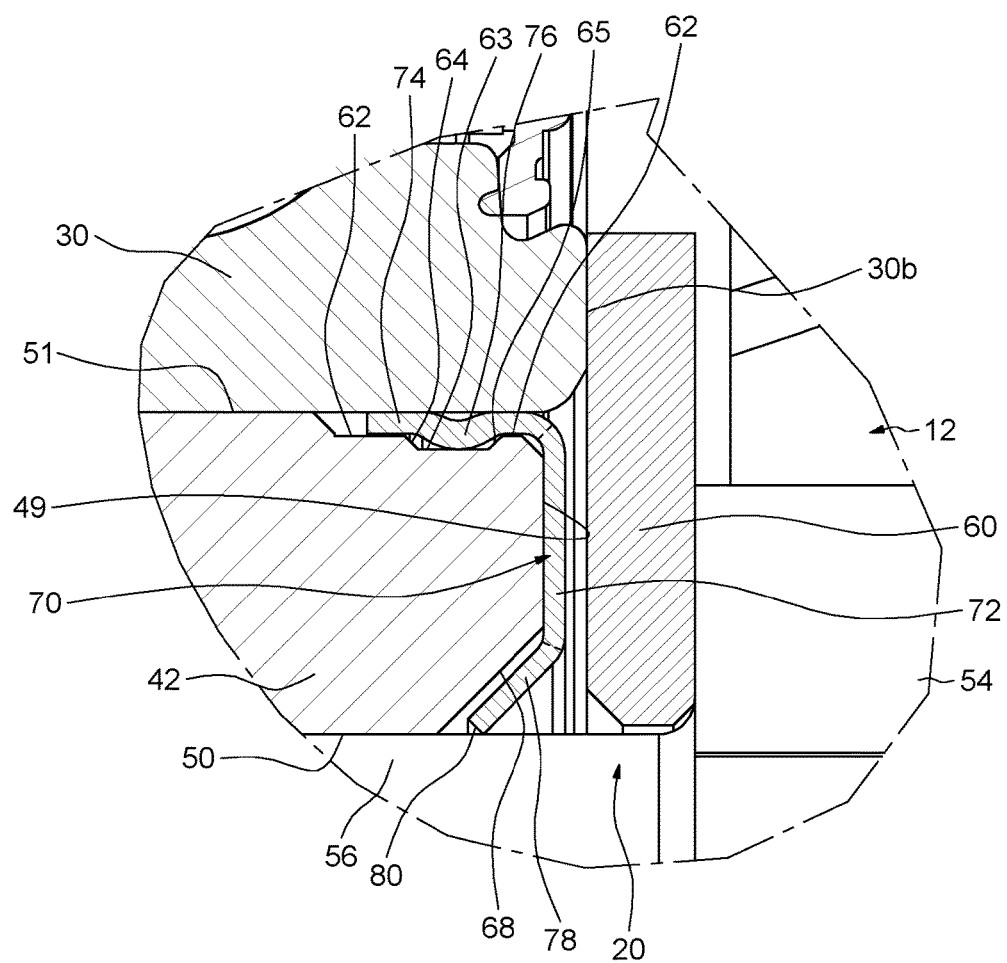
FIG. 2 is an enlarged view of FIG. 1.

As more precisely illustrated in FIG. 2, the outer surface 51 of spacer 18 provides an annular groove 62. Groove 62 extends axially on a portion of the outer surface 51 being adjacent to the front surface 49. An annular groove 63 is further provided in the bottom of the groove 62. Groove 63 is axially delimited between two frustoconical surfaces 64 and 65. Each of the frustoconical surfaces 64, 65 connect on one side to the bottom of groove 63 and on the other side to the bottom of groove 62.

Chamfer 68 is provided in the bore 50 of spacer 18 and opens to the radial surface 49. Chamfer 68 is arranged axially on the side of the screw head 54. Chamfer 68 is of truncated cone shape of axis 16 and. Smaller diameter of chamfer 68 is equal to the inner diameter of bore 50.

According to the invention, pulley device 10 provides an axial retention member 70 cooperating with the screw 20 to retain it in the spacer 18. In the illustrated embodiment, the axial retention member 70 has the function to secure the bearing 14, the spacer 18 and the fastening 20 together, particularly when the device 10 is not fixed to the external support, for example during the assembly and the transport. Axial retention member 70 has a cylindrical shape and is arranged around the axis 16. Axial retention member 70 is here a ring integrally formed, for example by cutting and stamping a blank metal sheet. Alternatively, axial retention member 70 could be made of synthetic material, for example polyamide. Axial retention member 70 is fixed against the outer surface 51 of spacer 18 and cooperates with the fastening screw 20 by contact.

Axial retention member 70 provides an annular radial support portion 72 mounted axially in abutment against the front surface 49 of spacer 18. Axial retention member 70 also provides an annular axial fixing portion 74 mounted on the outer surface 51 of the spacer 18. Axial retention member 70 further provides retention means for the screw 20, here an annular tongue 78. Fixing portion 74 axially extends an edge of large diameter of the support portion 72. Tongue 78 extends from an edge of small diameter of the support portion 72. Fixing portion 74 radially surrounds tongue 78. Fixing portion 74 has a substantially cylindrical shape around axis 16. The diameter of the fixing portion 74 is adapted to have the inner surface of the fixing portion 74 in radial contact with the groove 62 of spacer 18. Fixing portion 74 provides an annular rib 76 radially extending towards the interior of the device 10. Rib 76 extends in the groove 63. Fixing portion 74 is tightly fitted in radial contact against the bore of inner ring 30 of rolling bearing 14. The fixing portion is then force fitted in the free space defined by the grooves 62 and 63 of spacer 19, between the portion 42 of the spacer 18 and the inner ring 30.

Axial retention member 70 is securely maintained in the spacer 18 when the rib 76 is housed in the groove 63. The fastening of the axial retention member 70 with the spacer 18 is constituted by a diametrical interference between the rib 76 and the groove 63. This retention is reinforced by the contact pressure exerted by the inner surface of the fixing portion 74 on the groove 62. Alternatively, the annular rib 76 could be replaced by a boss or a plurality of bosses circumferentially spaced in the inner surface of the fixing portion 74. The retention of the axial retention member 70 with the spacer 18 is made by housing the boss(es) in the annular groove 63. In such an alternate embodiment, the annular groove 63 may be replaced by a hole or a plurality of holes, each hole being dedicated to receive a corresponding boss.

Tongue 78 is annular and obliquely extends from the support portion 72 towards the interior. Tongue 78 has a frustoconical shape similar to the chamfer 68. Tongue 78 is inserted in the chamfer 68. Tongue 78 provides an end 80 being in contact with the rod of fastening screw 20 and more particularly with the smooth portion 56. Tongue 78 is elastically deformable in the radial direction when the fastening screw 20 is inserted in the axial retention member 70. Tongue 78 prevents any axial displacement of the screw 20 in a direction opposite to its insertion direction in the bore 50 of spacer 18. Alternatively, the annular tongue 78 may be replaced by a plurality of circumferentially spaced tongues. In such an alternate embodiment, each tongue is elastically deformable in the radial direction so as to cooperate with the screw 20.

Fixing portion 74 exerts a contact pressure against the bore of the inner ring 30, the contact pressure being directed radially towards the exterior. This contact pressure induces an adhesion force being opposed to the displacement of the inner ring 30 with respect to the axial retention member 30. Thus, the axial retention member 70 axially retains the inner ring 30 relative to the spacer 18. In the present embodiment, the axial retention member 70 provides a dual locking function, the axial retention of the bearing 14 and the axial retention of the fastening screw 20.

The following assembly process is performed to get a pulley device 10 as illustrated in FIG. 1. In a first step, a first sub-assembly comprising the spacer 18, the axial retention member 70, the bearing 14 and the pulley 12 is assembled. The parts constituting the sub-assembly are secured together by the axial retention member 70. The disengagement of the spacer 18 from the inner ring 30 is prevented thanks to the member 70. It is not necessary to use additional external means to implement retention. Thus, the member 70 facilitates the assembly process. At the same time, a second sub-assembly comprising the fastening screw 20 and the ring 60 is assembled.

In a second step, the screw 20 is axially inserted in the bore 50 of spacer 18. More precisely, the rod of screw 20 is inserted in a bore delimited by the end 80 of the axial retention member 70. The tongue 78 is then radially deformed and an arc boutement effect induces an axial retention effort of the screw 20 with respect to the spacer 18. After this second step, the parts constituting the two sub-assemblies are secured, even if the pulley device is not fixed to the external support. It is then possible to store, handle, and transport the pulley device 10 without having to provide additional retention means.

Figure 3:
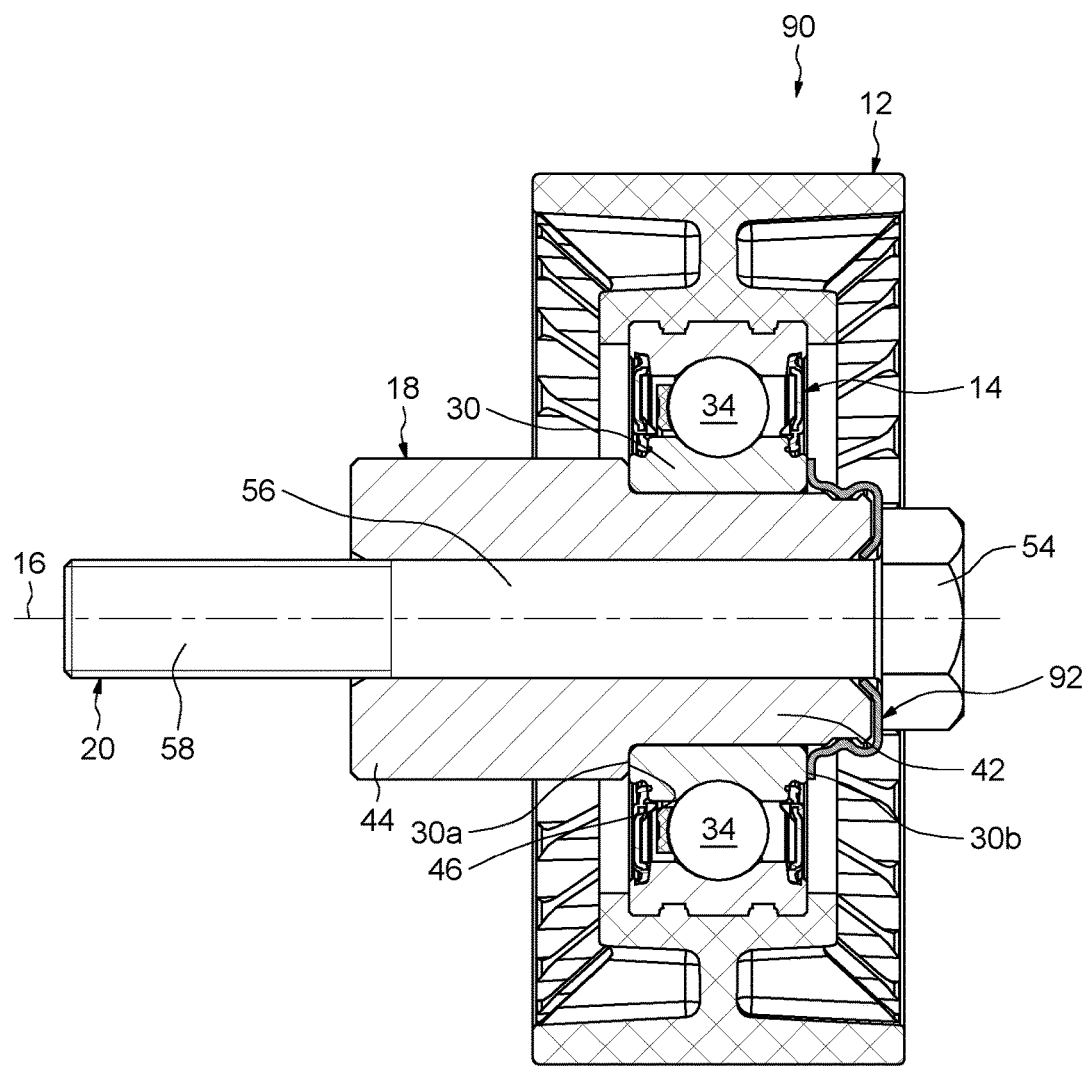
FIG. 3 is an axial sectional view of a pulley device according to a second embodiment of the invention.

FIG. 3 illustrates a pulley device 90. The parts of the pulley device 90 similar to the device 10 have the same references.

Pulley device 90 provides a pulley 12, a rolling bearing 14, a spacer 18 and a fastening screw 20.

Figure 4:
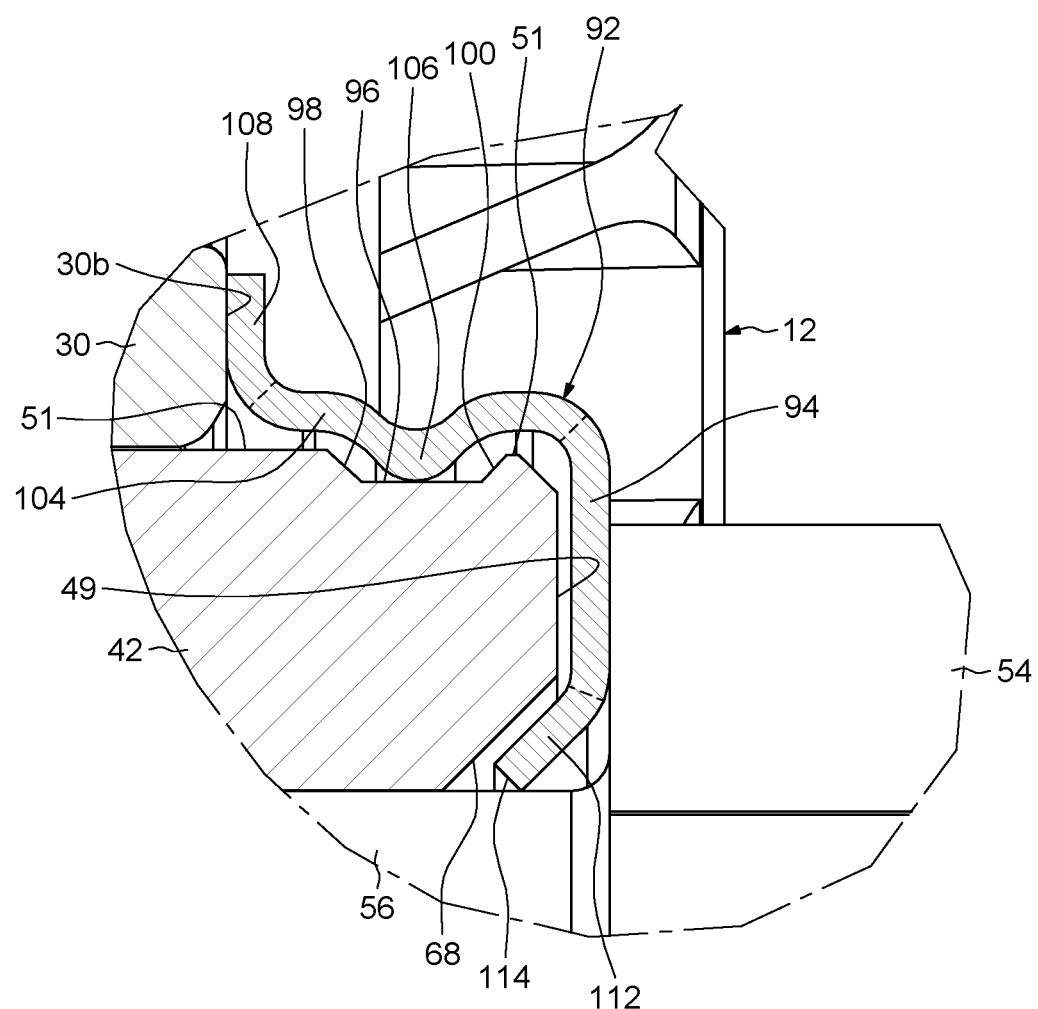
FIG. 4 is an enlarged view of FIG. 3.

Pulley device 90 provides an axial retention member 92 for retaining the fastening screw 20. The member is illustrated in details in FIG. 4.

Member 92 provides an annular radial support surface 94 mounted to axially face the front surface 49 of spacer 18. Member 92 also provides an annular axial fixing portion 104 mounted on the outer surface 51 of the spacer 18. Member 92 provides a collar 108 mounted in contact with the bearing 14. Member 92 further provides retention means for the screw 20, the means being an annular tongue 112. Structurally, the axial retention member 92 mainly differs from the member 70 of the first embodiment in that it is provided with the collar 108. In this illustrated example, the support portion 94 is not in direct contact with the front surface 49. The support portion 94 is in direct contact with the head 54 of the fastening screw 20. The use of a ring 60 of the device in FIG. 1 is prevented in this embodiment.

The outer surface 51 of spacer 18 provides an annular groove 96. Groove 96 is delimited by two opposite frustoconical surfaces 98 and 100.

Fixing portion 104 provides two ends being axially diametrically opposed. Fixing portion 104 extends an edge of large diameter of the support portion from one of these ends. Fixing portion 104 extends an edge of small diameter of collar 108 from the other end. Collar 108 is substantially provides in plan perpendicular to axis 16. Fixing portion 104 is axially delimited by the support surface 94 and by the collar 108. Collar 108 is mounted axially in contact against the front surface 30b of the inner ring 30.

Fixing portion 104 surrounds the outer surface 51 of spacer 18. Fixing portion 104 provides an annular rib 106 facing the groove 96. Rib 106 has an inner diameter lower than the diameter of the outer surface 51, and substantially equal to the diameter of groove 96. The diameter of the fixing portion 104 is greater than the diameter of the outer surface 51, except the rib 106. The rib 106 is then radially housed between the frustoconical surfaces 98 and 100 when the rib 106 is inserted in the groove 96.

The axial retention member 92 is secured with the spacer 18 thanks to the retention of rib 106 in the groove 96. The axial retention member 92 prevents any axial displacement of the bearing 14 relative to the spacer 18 thanks to the mechanical action of the collar 109 against the surface 30b.

The annular tongue 112 provides an end 114 defining a bore comprising the rod 59 of the fastening screw 20. Similarly to the tongue 78 of the first embodiment, the annular tongue 112 is elastically deformable and cooperates with the fastening screw 20 by contact so as to axially block the screw 20.

The axial retention member 92 provides a dual locking function, the axial retention of the bearing 14 and the axial retention of the fastening screw 20.

Figure 5:
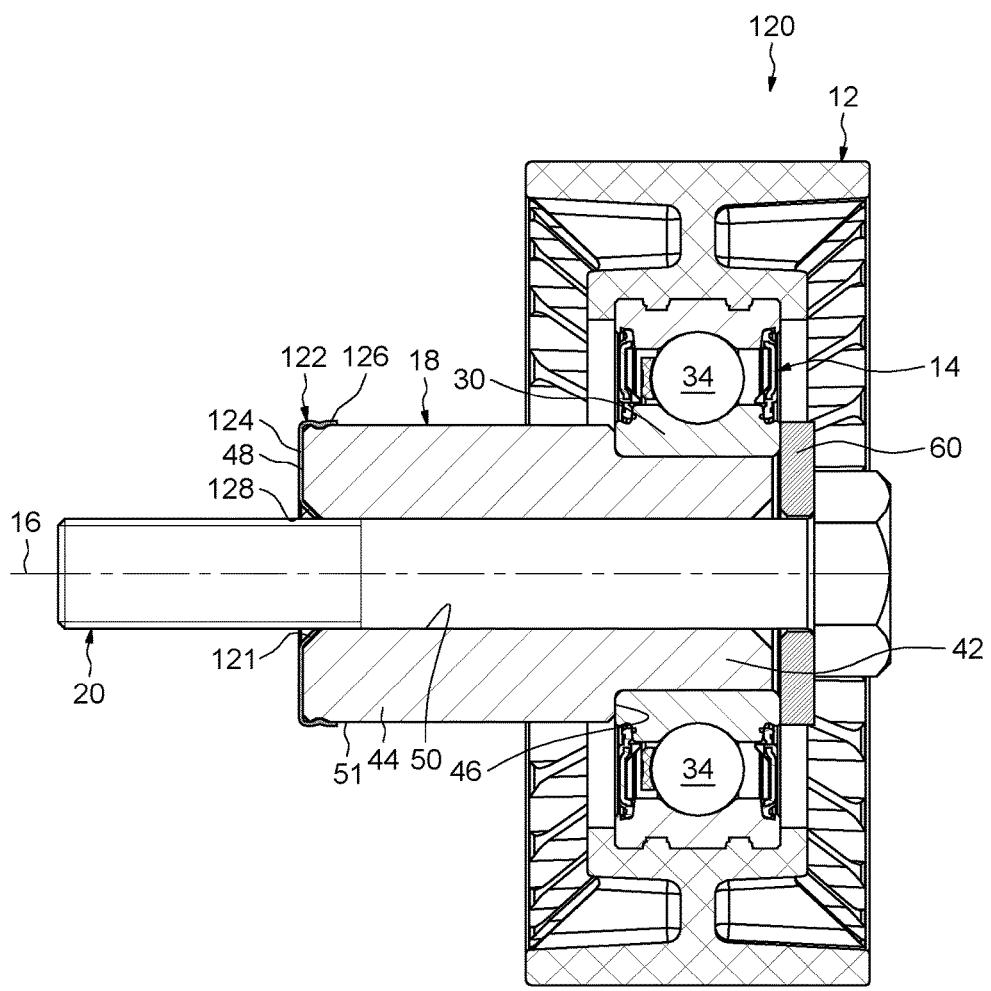
FIG. 5 is an axial sectional view of a pulley device according to a third embodiment of the invention.

FIG. 5 illustrates a third embodiment of a pulley device 120, in which the same elements have the same references.

This embodiment differs from the embodiment of FIG. 1 in that an axial retention member 122 is in contact against a front surface 48 of spacer 18, replacing the axial retention member 70 of the first embodiment which is in contact against the front surface 49. The axial retention member 122 presents a similar structure to the axial retention member of the first embodiment.

Bore 50 of spacer 18 provides a chamfer 121 open to the surface 48. Chamfer 121 is located axially of the side of the screw head 54. Axial retention member 122 provides an annular radial support portion 124 mounted in axial contact against the surface 48. Axial retention member 122 provides an annular radial support portion 126 mounted in radial contact against the outer surface 51. Axial retention member 122 provides an annular tongue 128 disposed radially in the chamfer 121. Alternatively, the tongue 128 may be disposed outside the bore of spacer 18. In such an alternate embodiment, the chamfer 121 is not necessary. A chamfer may be provided to the external support in which the tongue can be housed.

Fixing portion 126 cooperates with the outer surface 51 of spacer 18 to ensure the axial retention of member 122 relative to the spacer 18. For this purpose, fixing portion 126 provides a rib (not referenced) and the outer surface 51 provides a corresponding groove (not referenced) to cooperate with the rib. Alternatively, the fixing portion 126 may provide a groove in which a rib provided to the outer surface 51 is housed. According to another alternate embodiment, the fixing portion 126 provides a plurality of holes, each hole being dedicated to receive a boss.

Support portion 124 is annular and is substantially provided in a plan perpendicular to the axis 16. The larger diameter of the support portion 124 is substantially equal to the diameter of portion 44 of spacer 18, so as the fixing portion 126 to be able to cooperate with the outer surface 51 of spacer 18. The lower diameter of the support portion 124 is substantially equal to the diameter of a circle defined at the junction between the chamfer 121 and the surface 48.

The axial retention member 122 is axially maintained relative to the spacer 18 thanks to the fixing portion 126. The annular tongue 128 is radially deformed and cooperates with the threaded portion 58 of fastening screw 20 by contact pressure. The end of tongue 128 is housed in a thread of the threaded portion 58 by arc boutement effect. The fastening screw 20 is then axially retained with respect the spacer 18 in the opposite direction to the insertion direction.

The fastening screw 20 is maintained in position against the ring 60 when the screw is inserted at maximum. The ring 60 maintains the inner ring 30 against the shoulder 46 of spacer 18. Thus, the assembly of spacer 18, rolling bearing 14 and fastening screw 20 is secured. The invention provides a pulley device comprising assembled parts being secured together, even when the pulley device is not fixed to the external support.

Moreover, as described in reference to FIGS. 1 and 2, it is not required to us external means to secure the sub-assemblies parts during the pulley device assembly. The assembly process of the device is then facilitated. It is not required to use external means to maintain assembled the pulley device when it is not fixed to an external support. Storage, transport and handling of the device are facilitated before its mounting.

Since no external means are used, there is no need to dismount the means during the mounting process of the device onto the external support. The mounting process of the pulley device on the external support is then facilitated.

The invention facilitates the storage and the transport of the pulley device, and also facilitates the assembly and mounting processes.

The invention is illustrated on the basis of a pulley device comprising a rolling bearing provided with an inner ring, an outer ring and at least one row of rolling elements arranged between the rings. Alternatively, the bearing may be a sliding bearing and may provide an annular body, for example made of thermoplastic material, and may provide radial grooves able to be filled in with lubricant. According to another alternate embodiment, the sliding bearing may provide two raceways or rings in direct slide one to the other.

The invention claimed is:

1. A pulley device for a tensioner or an idler for a belt or a chain comprising:
   a pulley,
   a bearing,
   a spacer supporting the bearing and having a through bore,
   a fastening screw extending in the bore, and
   an axial retention member for the screw, the axial retention member being fixed to the spacer and providing retention means cooperating with the screw, wherein
   the axial retention member further provides a fixing portion with a rib extending in an annular groove provided to an outer surface of the spacer, and
   wherein the retention means of the axial retention member are elastically deformable at least in the axial direction and cooperate with the screw by contact.

2. The device according to claim 1, wherein the bore of spacer provides a chamfer, the retention means of the axial retention member being radially disposed in the chamfer.

3. The device according to claim 1, wherein the axial retention member includes a support portion being in axial abutment against an end surface of the spacer.

4. The device according to the claim 3, wherein the retention means extend radially towards the interior from the support portion.

5. The device according to claim 1, wherein the axial retention member is mounted with radial contact against the bore of bearing.

6. The device according to claim 1, wherein the axial retention member provides a collar extending the retention portion and mounted axially in abutment against the bearing.

7. The device according to claim 1, wherein the axial retention member comprises a clip and the retention means comprises a tongue or flange extending axially into the spacer and radially toward an axis of rotation of the pulley.

8. The pulley according to claim 7, wherein the tongue or flange engages an outer surface of the fastening screw.

9. The pulley according to claim 7, wherein the tongue or flange engages a threaded outer surface of the fastening screw.

10. The pulley according to claim 7, wherein the tongue or flange engages an unthreaded outer surface of the fastening screw.

11. A pulley device for a tensioner or an idler for a belt or a chain comprising:
    a pulley,
    a bearing,
    a spacer supporting the bearing and having a through bore,
    a fastening screw extending in the bore, and
    an axial retention member for the screw, the axial retention member being fixed to the spacer and providing retention means cooperating with the screw, wherein
    the axial retention member further provides a fixing portion with a rib extending in an annular groove provided to an outer surface of the spacer, and
    wherein the retention means of the axial retention member extend obliquely towards the screw and are able to axially block the screw by arc boutement effect.

12. The device according to claim 11, wherein the axial retention member comprises a clip and the retention means comprises a tongue or flange extending axially into the spacer and radially toward an axis of rotation of the pulley.

13. The pulley according to claim 12, wherein the tongue or flange engages an outer surface of the fastening screw.

14. The pulley according to claim 12, wherein the tongue or flange engages a threaded outer surface of the fastening screw.

15. The pulley according to claim 12, wherein the tongue or flange engages an unthreaded outer surface of the fastening screw.

16. A pulley device for a tensioner or an idler for a belt or a chain comprising:
- a pulley having an axis of rotation,
- a bearing,
- a spacer supporting the bearing and having a through bore and an outer surface and an annular groove in the outer surface,
- a fastening screw extending in the bore, and
- a clip configured to axially retain the screw in the spacer, the clip being fixed to the spacer and including a tongue or flange extending axially into the spacer and radially toward the axis of rotation and including a rib projecting into the annular groove.

17. The pulley according to claim 16, wherein the tongue or flange engages an outer surface of the fastening screw.

18. The pulley according to claim 17, wherein the tongue or flange engages a threaded outer surface of the fastening screw.

19. The pulley according to claim 17, wherein the tongue or flange engages an unthreaded outer surface of the fastening screw.

* * * * *